June 2, 1970   A. G. PASSARIELLO   3,514,884
COMBINATION CALENDAR AND ROOM DEODORANT
Filed June 9, 1967
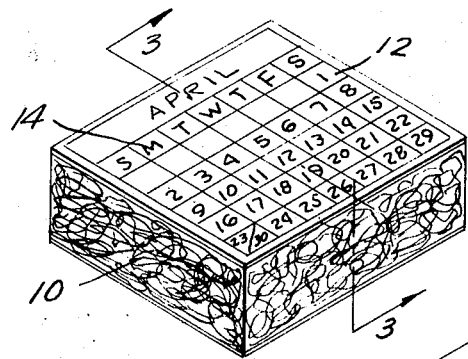
FIG. 1.
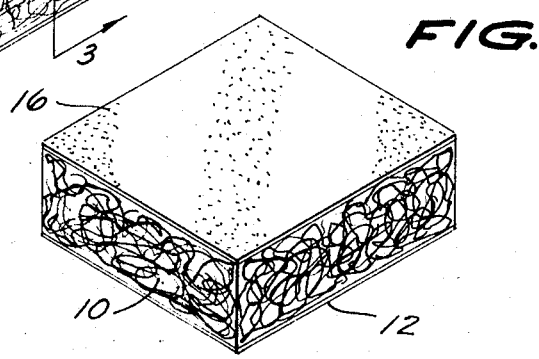
FIG. 2.
FIG. 3.
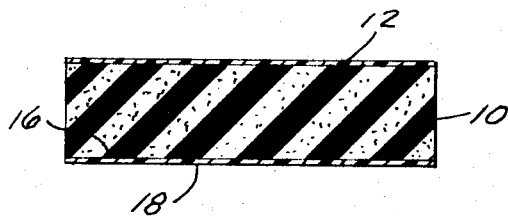
FIG. 4.
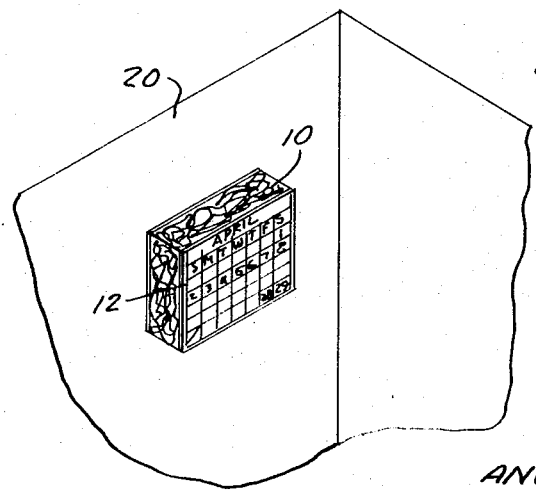
INVENTOR.
ANGELO G. PASSARIELLO,
BY
Berman, Davidson & Berman
ATTORNEYS.

United States Patent Office 3,514,884
Patented June 2, 1970

3,514,884
COMBINATION CALENDAR AND ROOM DEODORANT
Angelo G. Passariello, 1011 Parkland Place SE., Albuquerque, N. Mex. 87108
Filed June 9, 1967, Ser. No. 645,056
Int. Cl. G09f *19/00;* B42d *5/04*
U.S. Cl. 40—107      3 Claims

ABSTRACT OF THE DISCLOSURE

A block of permeable material saturated with a deodorant, said block having on one face a calendar sheet representing one month and on the opposite face a coating or layer of pressure-sensitive adhesive.

---

It is an object of this invention to provide a room deodorizer means which will be attractive in appearance, easily and conveniently placeable, and which, while contributing the utility of a highly visible calendar, at the same time automatically indicates when it is time for its own replacement.

The above and other objects will be made clear from the following detailed description taken in connection with the annexed drawing, in which:

FIG. 1 is a perspective view of the improved unit;

FIG. 2 is a view similar to FIG. 1, but showing the back side of the same unit;

FIG. 3 is a section on the line 3—3 of FIG. 1; and

FIG. 4 is a perspective view showing the improved unit in place.

Odor is probably the only sensor stimulus not yet susceptible of quantitative measurement and even its qualitative category will vary with the individual observer. So far as any particular observer is concerned, odors fall into one of the two broad categories of agreeable or disagreeable and, if the latter, then the problem arises as to what to do about it. The alternatives of what to do about it are exceedingly limited. It can, of course, be cut off at the source but this is rather difficult in kitchens and bathrooms with which the present invention is particularly concerned. The remaining alternatives are neutralization by chemical reaction, once again impractical for kitchens and bathrooms, or absorption or masking.

Where household as distinct from personal deodorant problems are encountered, for all practical purposes, absorption or masking are the only practical approaches. Masking is simply overpowering one odor with another, the other being presumably less objectionable. This principle is as old as unwashed royalty which goes back very far indeed. The principle of absorption or adsorption is considerably more recent and has been known at least as long as activated charcoal. Suffice to say, that at present there are numerous products which to a greater or less extent and with some degree of selectivity, will absorb or mitigate otherwise objectionable odors.

The present invention is not concerned with either masking or absorbing agents as such and either may be used in connection with this invention without departure from its spirit.

Referring now to FIG. 1, there is shown a block of porous material 10 which has only two physical requirements. First, it must be reasonably strong and self-sustaining, second, it must be porous, that is, capable of receiving and holding either a masking or an odor-absorbing agent.

Pine oil derivatives may be mentioned as typical of the former and chlorophyllin derivatives as typical of the latter. The precise agent is a matter of choice, depending on individual taste, but within these requirements, the block could be made of activated charcoal, silica gel, properly bonded diatomaceous earth, plastic foam, felt or even superimposed layers of cloth and paper. Either in the course of its formation, as in the case of felting or during the lamination of paper or cloth, or after it is formed, as in the case of activated charcoal, silica gel, diatomaceous earth, etc., the masking or absorbing agent is incorporated into the block.

A sheet of paper 12 carrying indicia 14 is adhered to one face of the block. Preferably, the indicia 14 correspond to an ordinary calendar leaf covering one month. The opposite face of the block 16 may be treated in any of several ways. It may be coated or impregnated with a pressure-sensitive material or a sheet of cloth or paper coated with pressure-sensitive material may be adhered to the face 16, but in either case a removable, protective, peelable sheet will be laid over the exposed pressure-sensitive surface for convenience in shipping, handling and application.

In FIG. 3, the face 16 of the block is shown as covered with a sheet of material 18 externally surfaced with pressure-sensitive adhesive and covered with a protective layer for convenience in handling and shipping. The protective layer is removed by peeling action in a manner well known in the art just prior to application of the unit in its final desired location.

One of the features of this invention is its convenience and versatility of application. In FIG. 4, it is shown as applied to a wall 20 of, say, a bathroom or kitchen. It could equally well be applied to a floor or ceiling, to the door of a cabinet or to the bathroom or kitchen door. The calendar has its obvious utility as a calendar and has a further utility in this particular connotation in that it automatically indicates when it is time for a change. This is not true, so far as applicant is aware, of any other deodorant device of any type whatever.

As a matter of marketing, each of the blocks complete with its calendar, its masking or deodorizer agent, and its backing sheet of protected pressure-sensitive adhesive will be individually wrapped, bagged or otherwise packaged in impervious sheet material. The packaged blocks will be packaged in lots of twelve, constituting a year's supply and distributed through much the same channels as calendars generally.

While certain specific details have been disclosed herein, it is not intended to limit this invention to the precise details disclosed but only as set forth in the subjoined claims.

What I claim is:

1. A deodorant device comprising a block of porous material impregnated with an odor-absorbing substance wherein each block includes a quantity of odor-absorbing substance sufficient for about one month's use, said block having its rear surface substantially covered with a pressure-sensitive adhesive, and its front surface substantially covered with an indicia-bearing sheet affixed thereto, said sheet comprising a calendar with indicia covering one month in duration.

2. A device as set forth in claim 1, in which the pressure-sensitive surface of the block comprises a sheet of flexible material adhered to the block and externally surfaced with a pressure-sensitive material and including a peelable shielding sheet adhered to said pressure-sensitive material.

3. A device as set forth in claim 1, wherein said block is hermetically sealed in a sheet of flexible impervious material, said device being packaged in units of 12 blocks, each of which has a single calendar sheet affixed thereto which differs from the next block whereby an entire year is provided in each package.

References Cited

UNITED STATES PATENTS

| | | | |
|---|---|---|---|
| 237,584 | 2/1881 | Ogle | 40—107 X |
| 2,615,754 | 10/1952 | Lindenberg | 239—56 X |
| 2,755,576 | 7/1956 | Golden | 40—121 X |
| 3,065,915 | 11/1962 | Samann | 239—56 X |

FOREIGN PATENTS 338,830  11/1930  Great Britain.

EUGENE R. CAPOZIO, Primary Examiner

P. V. WILLIAMS, Assistant Examiner

U.S. Cl. X.R.

40—1; 283—2